United States Patent
Haberstock et al.

(10) Patent No.: US 12,241,483 B2
(45) Date of Patent: Mar. 4, 2025

(54) METHOD FOR THE OPEN-LOOP CONTROL OF A PUMP SYSTEM

(71) Applicant: ZF Friedrichshafen AG, Friedrichshafen (DE)

(72) Inventors: Alexander Haberstock, Ravensburg (DE); Mario Hasel, Wangen (DE); Clemens Moser, Mittelberg (AT); Anshuman Deshpande, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/342,082

(22) Filed: Jun. 27, 2023

(65) Prior Publication Data

US 2023/0417259 A1     Dec. 28, 2023

(30) Foreign Application Priority Data

Jun. 28, 2022   (DE) ..................... 10 2022 206 502.6

(51) Int. Cl.
  *F15B 11/17*     (2006.01)
  *F16H 57/04*    (2010.01)
  *F16H 61/00*    (2006.01)

(52) U.S. Cl.
  CPC .......... *F15B 11/17* (2013.01); *F16H 57/0435* (2013.01); *F16H 61/0025* (2013.01);
  (Continued)

(58) Field of Classification Search
  CPC ............ F16H 57/0409; F16H 57/0439; F16H 57/0441; F16H 61/0025; F16H 61/0031
  See application file for complete search history.

(56) References Cited

U.S. PATENT DOCUMENTS 7,415,820 B2 *   8/2008   Moorman ................ B60K 6/48
                                                          137/512.5
7,481,053 B2 *   1/2009   Kitano ................ F16H 61/0031
                                                              60/329

(Continued)

FOREIGN PATENT DOCUMENTS

DE   102015201107 A1   7/2016
DE   102018214427 A1   2/2020

(Continued)

OTHER PUBLICATIONS

German Search Report DE 10 2022 206 502.6, dated Feb. 17, 2023. (12 pages).

*Primary Examiner* — Thomas E Lazo
(74) *Attorney, Agent, or Firm* — Dority & Manning, P.A.

(57) ABSTRACT

A method for the open-loop control of a pump system (5) includes accessing a hydraulic calculation model by an electronic control unit, which includes, for various operating states of a transmission, information regarding oil supplies of two pumps (P, S) of the pump system (5) and information regarding oil demands of the transmission. The method also include ascertaining a certain oil supply ($\dot{V}_{supply}$), which the two pumps (P, S) provide in a certain operating state of the transmission according to the hydraulic calculation model. In addition, the method includes ascertaining a certain oil demand ($\dot{V}_{demand}$), which the hydraulic system (1) requests of the two pumps (P, S) in the certain operating state of the transmission according to the hydraulic calculation model.

11 Claims, 6 Drawing Sheets

(52) U.S. Cl.
CPC ............... *F15B 2211/6657* (2013.01); *F16H 2061/0037* (2013.01)

(56) References Cited

U.S. PATENT DOCUMENTS

| | | | | |
|---|---|---|---|---|
| 10,508,730 | B2* | 12/2019 | Buchmann | F01M 1/02 |
| 10,845,001 | B2* | 11/2020 | Ono | F16H 57/0435 |
| 2009/0232673 | A1* | 9/2009 | Reisch | F16H 57/0434 |
| | | | | 417/364 |
| 2010/0216597 | A1* | 8/2010 | Grundler | F16H 61/0031 |
| | | | | 192/85.01 |
| 2011/0120568 | A1* | 5/2011 | Borntraeger | F16H 61/0031 |
| | | | | 137/565.01 |
| 2011/0144846 | A1* | 6/2011 | Zollner | B60W 20/10 |
| | | | | 903/917 |
| 2017/0307065 | A1* | 10/2017 | Buchmann | F16H 57/0439 |
| 2023/0029138 | A1 | 1/2023 | Koch et al. | |

FOREIGN PATENT DOCUMENTS

| | | |
|---|---|---|
| DE | 102019204277 A1 | 10/2020 |
| DE | 102020204675 A1 | 10/2021 |

\* cited by examiner

METHOD FOR THE OPEN-LOOP CONTROL OF A PUMP SYSTEM

CROSS-REFERENCE TO RELATED APPLICATION

The present application is related and has right of priority to German Patent Application No. 102022206502.6 filed on Jun. 28, 2022, which is incorporated by reference in its entirety for all purposes.

FIELD OF THE INVENTION

The invention relates generally to a method for the open-loop control of a pump system.

BACKGROUND

Hydraulic control units in automatic transmissions of motor vehicles are typically subdivided into three circuits, which are operated in order of priority. A primary circuit is used to supply shift elements (multi-disk clutches/multi-disk brakes) of the automatic transmission, a secondary circuit is used for cooling and lubrication, and a tertiary circuit is used to return an excess amount of oil to a pump system of the automatic transmission (suction loading). The primary circuit usually requires a high pressure at a low volumetric flow rate (outside of gear shifts) and the secondary circuit usually requires a low pressure (usually approximately one third (⅓) of the pressure of the primary circuit) at a high volumetric flow rate (for cooling/lubrication). The tertiary circuit has no direct requirements. Instead, the tertiary circuit delivers the excess amount of oil (depending on the pump delivery rate) that is not needed by the primary circuit and/or by the secondary circuit back to the oil pump.

The oil supply is provided via the pump system, which typically delivers a volumetric flow that is proportional to an input speed of the automatic transmission, more particularly to a rotational speed of an internal combustion engine. In modern systems that include a power-split pump (summation gearbox), it is possible to "boost" the pump speed via an electric motor (electric motor unit, or EMU) and thus provide more volumetric flow than is provided purely via the internal combustion engine speed.

A dual-circuit pump system is used in modern automatic transmissions in order to reduce power consumption (pressure multiplied by volumetric flow rate) and thus also the energy demand of the pump system. The dual-circuit pump system frequently consists of a double-stroke vane pump, which is subdivided into a primary flow and into a secondary flow. In such systems, the pressure in the secondary flow can be reduced to a lower level (approximately zero (0) bar is also possible), whereby the input torque and thus the drive power of the pump as well are reduced. The great advantage of the dual-circuit pump system is that, in situations in which a high volumetric flow is required in the primary circuit (for example, to engage a shift element during a gear shift), the pressure in the secondary flow can be increased to the primary pressure in order to provide the volumetric flow of the secondary flow to the primary circuit. This is referred to as "connecting the secondary flow." Therefore, the overall displacement of the pump system can be used to improve the supply and to reduce pressure drops.

The connection of the secondary flow is controlled by an open-loop system via a self-regulating hydraulic system, which consists of two valves (a system pressure valve and a lubricating valve) and increases the pressure in the secondary flow when the delivery rate of the primary pump does not suffice to meet the demands of the primary circuit. The demand in the primary circuit is made up of the basic leakage, which is caused by valve gaps (and is mainly dependent on pressure and temperature), and a gear shift demand to fill a shift element, in addition to an oil flow through a torque converter, if necessary, when this is a converter transmission.

Due to this behavior, two typical operating states result for the pump system. In the "single-circuit operation," approximately the same pressure prevails in both pump flows (the opening pressure of the plate valve determines the pressure differential). The pressure control in both flows is carried out by the system pressure valve. The pressure in the secondary flow is decreased in the "dual-circuit operation." The primary pressure is then controlled by a closed-loop system via the system pressure valve and the secondary pressure is controlled by a closed-loop system via the lubricating valve. The dual-circuit operation can be achieved only when the delivery rate of the primary flow is sufficient to cover the demand of the primary circuit. The state of the flows depends on the oil demand (leakage, shift demand, etc.) of a hydraulic control unit and the supply (volumetric flow of the pump).

DE 10 2019 204 277 A1 teaches that, when the dual-circuit pump of the hydraulic system is driven exclusively by the electric machine at a predefined target primary circuit pressure, the rotational speed of the dual-circuit pump is to be changed, preferably increased, via the rotational speed of the electric machine. An electrical parameter, such as the electrical input current of the dual-circuit pump of the hydraulic system or of the electric machine, or the gradient of the input current, is monitored. When a defined change in the monitored parameter is detected, it is inferred that, at the rotational speed of the dual-circuit pump or of the electric machine, at which the defined change in the monitored parameter is present, either the volumetric flow of oil, which is provided by the dual-circuit pump, provides a pressure in the primary circuit of the hydraulic system that exactly corresponds to the target primary circuit pressure, or the dual-circuit pump provides a volumetric flow of oil that is so high that solely a volumetric flow of oil of the primary flow of the dual-circuit pump exactly saturates the primary circuit.

In the dual-circuit operation, the system pressure valve typically controls by way of a closed-loop system on a primary control edge. In order to switch from this state into the single-circuit operation, the system pressure valve must switch the control edge and a valve slide of the system pressure valve must be moved onto a secondary control edge. This path change does not take place arbitrarily quickly, and therefore the volumetric flow of the secondary flow can not yet support the primary flow while the valve slide is moving (the pressure is below the primary pressure). Only when the system pressure valve moves onto the secondary control edge can one hundred percent (100%) of the volumetric flow of the pump be utilized.

SUMMARY OF THE INVENTION

Example aspects of the present invention provided improved change-over of the system pressure valve during a switch from the dual-circuit operation into the single-circuit operation and vice versa.

Example aspects of the present invention provide an exemplary calculation of the pressure conditions in a pump system having two pumps. The actual pressure control is carried out, more particularly, via a system pressure valve and/or via a lubricating valve. More particularly, a calculation of the pressure conditions of the secondary flow is to be carried out depending on the oil supply (pump speed) and the oil demand of the transmission. With the knowledge of the state of the pump flow (single-circuit operation/dual-circuit operation), boundaries can be drawn within the shift software and the sequences of the gear shifts can be temporally controlled such that the system is not overloaded with respect to an oil requirement and pressure drops are avoided. In this way, the state of the pump system can determined via back-calculation on the basis of a calculation model. In other words, example aspects of the invention relate to an exemplary calculation of the oil demands and pump delivery rates of a transmission and, on the basis thereof, an exemplary calculation of the pressure states in a dual-circuit pump system. On the basis of supply and demand, it is possible to calculate which volumetric flows can be requested of the pump system without generating a system pressure drop and thus a deterioration of the shift quality.

In this sense, a method for the open-loop control of a pump system is provided according to example aspects of the invention. According to this method, a transmission for a motor vehicle and a hydraulic calculation model are provided. The transmission has a hydraulic system, which includes an electronic control unit and a pump system having a first pump (more particularly a primary flow) and having a second pump (more particularly a secondary flow). The hydraulic calculation model includes, for various operating states of the transmission, information regarding oil supplies of the two pumps and information regarding oil demands of the transmission.

The hydraulic calculation model is accessed by the electronic control unit. A certain oil supply, which the two pumps provide in a certain operating state of the transmission according to the hydraulic calculation model, is ascertained by the electronic unit. A certain oil demand, which the hydraulic system requests of the two pumps in the certain operating state of the transmission according to the hydraulic calculation model, is ascertained by the electronic control unit. The output pressures of the two pumps can, according to one example embodiment, be subsequently controlled on the basis of the ascertained certain oil supply and on the basis of the ascertained certain oil demand. This open-loop control is carried out, more particularly, by the electronic control unit.

According to one example embodiment, it is provided that the open-loop control of the output pressures of the two pumps is carried out such that the pump system is operated either in a single-circuit operation or in a dual-circuit operation. With this piece of information regarding the state in which the pump system is in according to the calculation model, the pump system can be appropriately actuated in order to not overload the pump system (i.e., request too much oil) and prevent a system pressure drop. In the single-circuit operation, both pumps can deliver their entire volumetric flow of oil into a primary circuit of the hydraulic system via a system pressure valve, and so a particularly high volumetric flow within the primary circuit can be requested.

In the single-circuit operation, a second output pressure, which is generated by the second pump, is as high as a first output pressure, which is generated by the first pump, or is at least approximately as high as the first output pressure. Excess oil can be drained into a secondary circuit of the hydraulic system via a secondary control edge of a valve slide of the system pressure valve. In this sense, the pump system according to one example embodiment can be operated in the single-circuit operation by moving a valve slide of a system pressure valve of the hydraulic system into a first switching position. Oil delivered by the two pumps of the pump system is delivered exclusively into the primary circuit via the valve slide when the valve slide is in the first switching position, a secondary pressure output by the second pump increasing to a primary pressure output by the first pump.

As soon as the primary circuit no longer requests all the oil delivered by both pumps and the primary pump delivery rate is sufficient to saturate the primary circuit, the pump system transitions into the dual-circuit operation. In the dual-circuit operation, the entirety of the secondary delivery is drained into the secondary circuit of the hydraulic system via the secondary control edge of the valve slide, excess oil from the primary flow additionally also being directed into the secondary circuit via a primary control edge of the valve slide. In the dual-circuit operation, the second output pressure, which is generated by the second pump, is considerably lower than the first output pressure, which is generated by the first pump. In this sense, it is provided according to one further example embodiment that the pump system is operated in the dual-circuit operation by moving the valve slide into a second switching position, oil delivered by at least one of the two pumps of the pump system being delivered into the secondary circuit via the valve slide when the valve slide is in the second switching position.

The supplies and demands can be stored within the hydraulic calculation model depending on various system parameters (for example, pressure, temperature, gear ratio change, torque profile), whereby the state of the pump system can be determined via back-calculation. In this sense, it is provided according to one further example embodiment that the oil supplies and the oil demands depend on various system parameters of the automatic transmission.

According to one further example embodiment, an oil balance can be calculated. This is carried out, more particularly, by the electronic control unit, the oil balance being ascertained on the basis of the certain oil supply and on the basis of the certain oil demand. The hydraulic calculation model can include a supply volumetric flow, which the pump system provides in a certain operating state of the transmission according to the hydraulic calculation model. The hydraulic calculation model can also include a demand volumetric flow of oil, which the hydraulic system requests of the two pumps in the certain operating state of the transmission according to the hydraulic calculation model.

In this context, the "primary excess amount" can be considered to be an important variable. This variable corresponds to the volumetric flow via the primary control edge and is calculated from the difference between the delivery rate of the primary flow and the primary demand of the hydraulic control unit HSG (leakage plus gear shift demand and, optionally, plus oil flow via a hydrodynamic torque converter of the transmission). If the variable is positive, the pump system is in the dual-circuit operation (the primary flow can cover the primary demand and the excess amount is discharged). If the variable is computationally negative (which, physically speaking, makes no sense, however), the primary pump flow does not suffice to cover the demand and the system is in the single-circuit operation. In this sense, it is provided according to one further example embodiment that the demand volumetric flow of oil according to the hydraulic calculation model is requested by a primary circuit of the hydraulic system in the certain operating state, the supply volumetric flow according to the hydraulic calculation model being provided by the first pump of the pump system in the certain operating state. The demand volumetric flow of oil is subtracted from the supply volumetric flow to calculate the oil balance.

For the calculation or ascertainment of the demand volumetric flow of oil, a leakage model/demand model (or characteristic map), which describes the primary leakage, more particularly depending on the oil temperature and the system pressure, can be provided to the hydraulic control unit in the transmission software. In this sense, the demand volumetric flow of oil can include a leakage volumetric flow, which arises within the primary circuit. The leakage can be dependent on a temperature of the oil, more particularly on a temperature of the oil within the primary circuit. Moreover, the leakage can depend on a pressure that prevails within the primary circuit.

In addition, a gear shift demand in the transmission software can be output, whereby the states (or transitions) during a gear shift can also be calculated or ascertained. In this sense, the demand volumetric flow of oil can include an engagement volumetric flow, which the primary circuit requests of the pump system for engaging a shift element of the transmission.

Instead of the primary excess amount, another volumetric flow variable can be defined as a reference value, for example, the secondary excess amount. Moreover, the volumetric flow in the secondary circuit can be calculated via the exemplary mapping. This volumetric flow enables a pressure increase in the secondary circuit, which can also be calculated via an appropriate model in order to determine the pressure conditions in the pump.

With the knowledge of the transmission input speed and, optionally, the rotational speed of the pump electric motor, the delivery rate of the two flows can be determined using a regression model of the pumps and thus the volumetric flow conditions can be calculated in the controller. In this sense, according to one further example embodiment, the supply volumetric flow depends on at least one rotational speed at which the pump system is driven. The supply volumetric flow is composed of a first pump volumetric flow and of a second pump volumetric flow. The first pump volumetric flow and the second pump volumetric flow result via a regression model from the supply volumetric flow of the pump system.

The method according to example aspects of the invention makes it possible—as described above—to calculate the oil supply/oil balance (the difference between demand and supply) and, from this volumetric flow difference, request a rotational speed at an electric motor of the pump system (the electric motor drives the pump system via a summation gearbox in combination with one further prime mover, for example, an internal combustion engine or one further electric motor for driving the motor vehicle), in order to ensure the functionality of the transmission. Due to this detailed calculation, the electric motor is not actuated "blindly" at a maximum rotational speed as soon as the supply is insufficient, but rather can merely supplement the deficit. This provides advantages with respect to the service life and consumption. Due to the additional volumetric flow via the electric motor, states can arise, however, in which the pump system switches from the dual-circuit operation into the single-circuit operation, or vice versa, depending on which primary and secondary demands are being requested at that time, without the oil observer or controller having knowledge thereof. There is a need, therefore, for the pump system or the oil observer to establish the defined single-circuit operation or the dual-circuit operation according to demand, since the system pressure drops easily upon any change-over that is not known to the system, thereby affecting the shift quality. In this way, the rotational speed can be actuated not only such that the demands of the transmission are covered, but rather a higher (or, rarely, also a lower) rotational speed can also be actuated according to demand in order to establish the state of the pump system according to the situational requirement. In this sense, it is provided according to one further example embodiment that the pump system is driven via a summation gearbox by a prime mover for driving the motor vehicle and by an electric motor, an electric motor speed being controlled on the basis of the ascertained oil balance.

BRIEF DESCRIPTION OF THE DRAWINGS

Exemplary embodiments of the invention are explained in greater detail in the following with reference to the schematic drawings, identical or similar elements being labeled with the same reference character, wherein.

DETAILED DESCRIPTION

Figure 1:
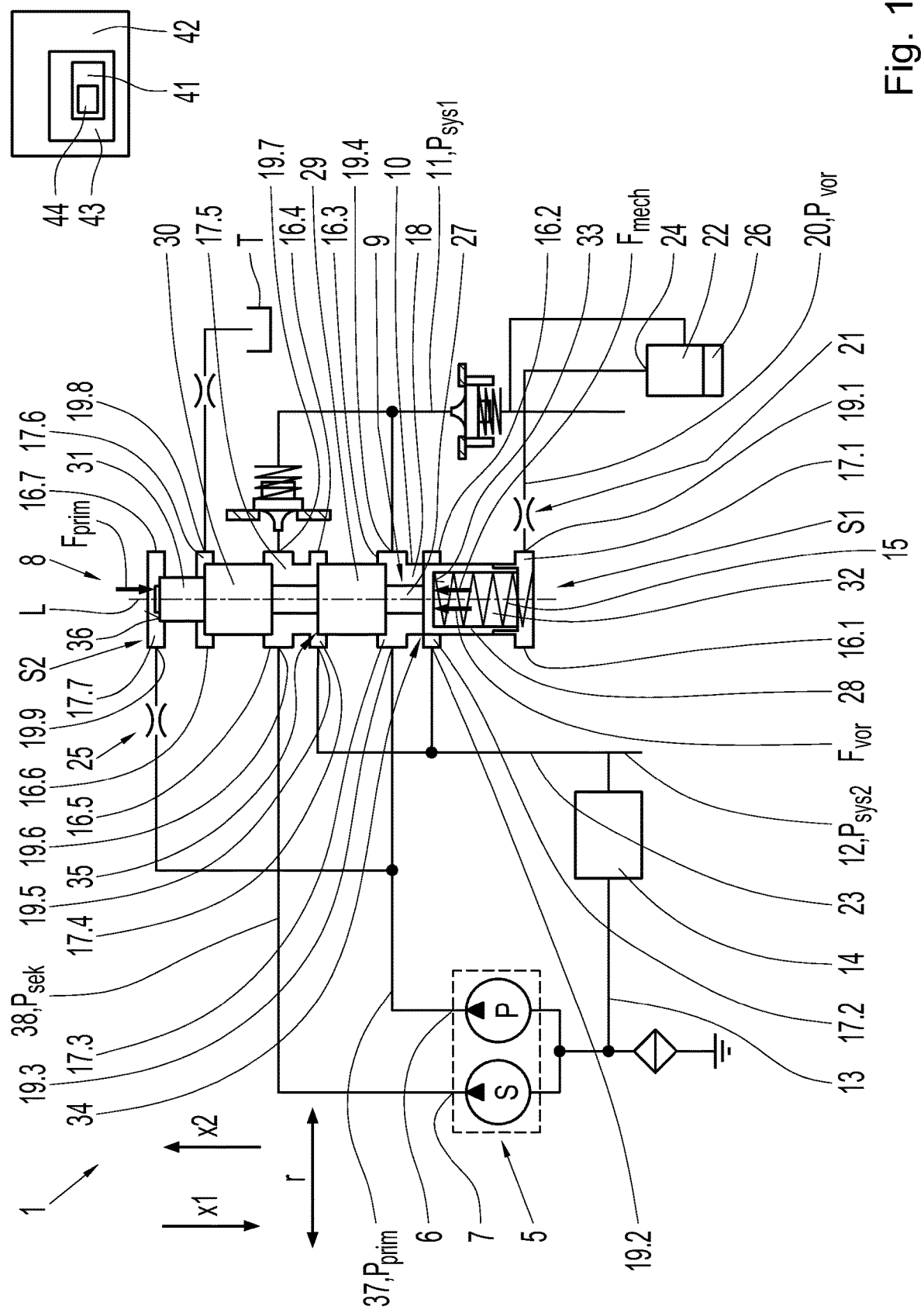
FIG. 1 shows a circuit diagram of a hydraulic system for an automatic transmission of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
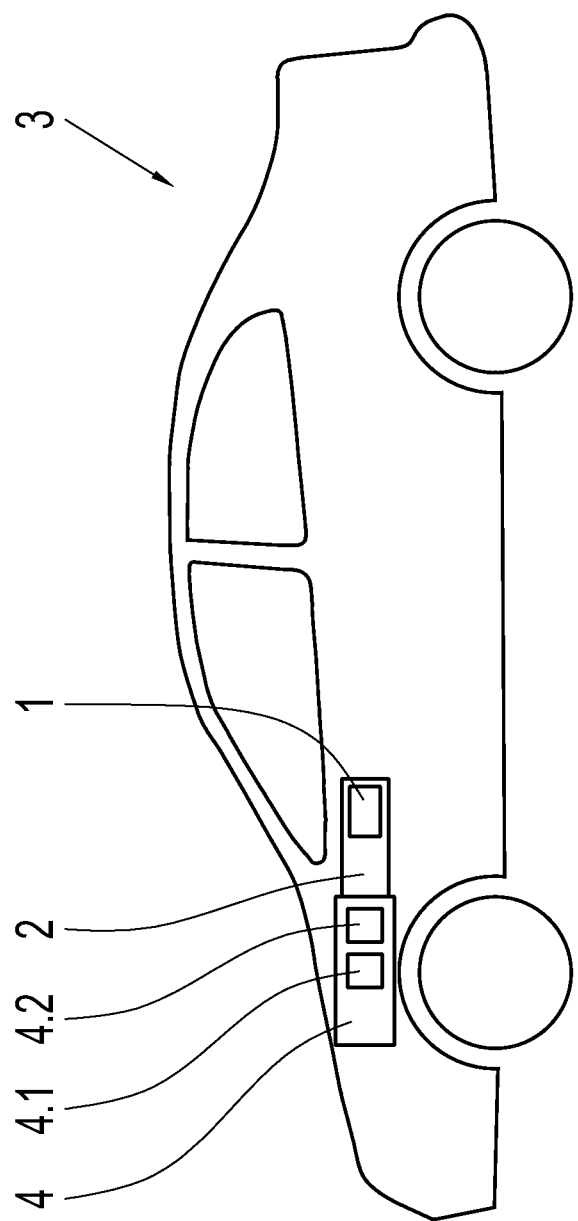
FIG. 2 shows a side view of a motor vehicle having an automatic transmission, which includes a hydraulic system from FIG. 1.

FIG. 1 shows a hydraulic system 1, which can be used in an automatic transmission 2 of a motor vehicle 3 shown in FIG. 2. The motor vehicle 3 has at least one prime mover 4, which drives the motor vehicle 3 via the automatic transmission 2. The motor vehicle 3 shown can be, for example, a hybrid vehicle, which can be driven by an internal combustion engine 4.1 and/or by an electric machine 4.2. Alternatively, however, only the internal combustion engine 4.1 or the electric machine 4.2 can be provided for driving the motor vehicle 3.

FIG. 1 shows only a portion of the entire hydraulic system 1, which is designed to actuate multiple shift elements (brakes and/or clutches; not shown) of the automatic transmission 2. The hydraulic system 1 includes, more particularly, a pump system 5.

The pump system 5 includes a first pump P and a second pump S. The first pump P ("primary pump") has a first pressure outlet 6. The second pump S ("secondary pump")

has a second pressure outlet 7. The hydraulic system 1 also includes a system pressure valve 8 having a valve slide, which is referred to in the following as a system pressure valve slide 9, and having a valve housing 10. The hydraulic system 1 also has a primary circuit 11 and a secondary circuit 12.

The primary circuit 11 is used to supply the shift elements (clutches/brakes) of the automatic transmission 2 with a pressurized hydraulic fluid (oil in the exemplary embodiment shown), whereas the secondary circuit 12 is used to cool and lubricate the automatic transmission 2 by the hydraulic fluid. A tertiary circuit 13 ("suction loading") of the hydraulic system 1 is used to return an excess amount of the hydraulic fluid to the pump system 5 of the automatic transmission 2. A higher pressure at a lower volumetric flow (outside of gear shifts) prevails in the primary circuit 11 in comparison to the secondary circuit 12, within which a lower pressure (approximately a third (⅓) the pressure that prevails in the primary circuit 11) at a higher volumetric flow prevails (for cooling/lubrication). The tertiary circuit 13 has no direct requirements. Instead, the tertiary circuit 13 is supplied with the excess amount (depending on the pump flow rate) of the hydraulic fluid that is not needed by the primary circuit 11 or by the secondary circuit 12. The open-loop control, according to which of the two circuits 11, 12 is supplied first, is carried out by the system pressure valve 8, which is designed as a pressure control valve. The open-loop control, according to which how much oil is directed out of the secondary circuit 12 into the suction loading 13, is carried out by a lubricating valve 14. The exemplary embodiments are described in the following in the context of oil as the hydraulic fluid. Other hydraulic fluids can also be used in a similar way, however.

Figure 3:
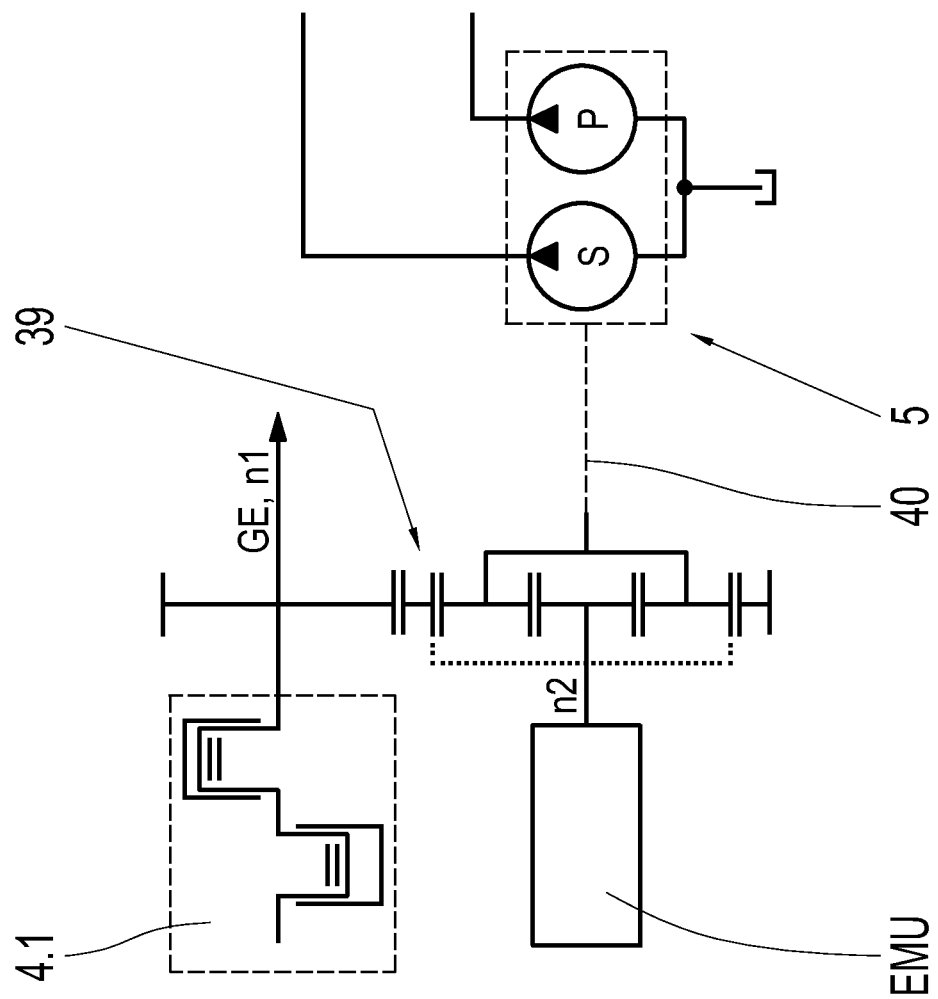
FIG. 3 shows a circuit diagram of a drive of a pump system of the hydraulic system from FIG. 1.

The oil supply is provided via the pump system 5, which delivers a volumetric flow, which is typically proportional to an input speed of the automatic transmission 2. FIG. 3 shows, in this context, that the internal combustion engine 4.1 drives an input shaft 40 of the pump system 5 via a summation gearbox 39. The internal combustion engine 4.1 drives a main input shaft GE of the automatic transmission 2 at an internal combustion engine speed n1. Due to the summation gearbox 39, the pump system 5 becomes a power-split pump. The rotational speed of the pump system 5 can be increased ("boosted") by an additional electric motor EMU, which provides an electric motor speed n2. Therefore, a greater volumetric flow can be provided by the pump system 5 than can be provided purely via the internal combustion engine speed. Alternatively, the rotational speed of the pump system can also be slightly reduced by the electric motor EMU in order to establish the state of the pump system 5 according to the situational requirement. A dual-circuit pump system is used in order to reduce power consumption (pressure multiplied by volumetric flow) and thus also the energy demand of the pump system, the dual-circuit pump system being in the form of a double-stroke vane pump 5 in the exemplary embodiment shown. One example of a suitable double-stroke vane pump is known, for example, from DE 10 2016 218 186 A1 (cf. here, more particularly, FIGS. 2 through 4) of the applicant.

In the case of the double-stroke vane pump 5, the pressure in one flow (secondary flow; output or provided via the second pressure outlet 7 of the second pump S) can be reduced to a lower level (approximately zero (0) bar is also possible), whereby the input torque and thus wear are reduced. A primary flow can be output or provided via the first pressure outlet 6 of the first pump P. A great advantage of the dual-circuit pump system 5 is that, in situations in which a high volumetric flow is required in the primary circuit 11 (for example, during a gear shift of one or more of the shift element(s) of the automatic transmission 2), the pressure in the secondary flow can be increased to a primary pressure, which is provided by the primary flow, in order to make the volumetric flow of the secondary flow available to the primary circuit. Therefore, the overall displacement of the pump system 5 can be used to improve the supply and to reduce pressure drops.

The connection of the secondary flow is controlled via a self-regulating hydraulic subsystem, which includes the system pressure valve 8 and the lubricating valve 14 (shown merely schematically in the drawing without ports or the like) and connects the secondary flow when the primary circuit 11 is undersaturated. The secondary flow is connected by connecting the second pressure outlet 7 of the pump system 5 to the primary circuit 11 via the system pressure valve 8, which is achieved by positions of the system pressure valve slide 9 that are suitable for this purpose. The amount of oil required and the pressure required within the primary circuit 11 are made up of the basic leakage, which is caused by valve gaps (and is dependent mainly on pressure and temperature), and a gear shift demand for filling at least one shift element.

The system pressure valve 8 is a directional valve, which includes, more particularly, the valve housing 10 and the system pressure valve slide 9. The system pressure valve slide 9 can be moved or displaced back and forth within the valve housing 10 in opposite axial directions x1 (first axial direction) and x2 (second axial direction) along a longitudinal axis L of the system pressure valve 6. The system pressure valve slide 9 is mechanically preloaded in a first switching position by a restoring element in the form of a spring element 15. The spring element 15 is arranged in the area of a first end face S1 of the system pressure valve 8.

The system pressure valve 8 has seven valve collars 16.1 through 16.7 arranged at a distance to one another along the longitudinal axis L. The valve collars 16.1 through 16.7 can be formed by the valve housing 10. The valve collars 16.1 through 16.7 are hollow inside, extend more particularly three hundred and sixty degrees (360°) around the edge, and form a valve pocket 17.1 through 17.7, respectively, each of which extends further outwards in a radial direction r of the system pressure valve 8 than a longitudinal bore 18 of the valve housing 8 extending in the longitudinal direction L of the system pressure valve 10. The valve housing 10 also has at least one port in the area of each of the valve pockets 17.1 through 17.7, each port being connected to one of the valve pockets 17.1 through 17.7.

The first valve collar 16.1, the first valve pocket 17.1, and a first port 19.1 are arranged in the area of the first end face S1. The first port 19.1 is a pressure inlet and, in the exemplary embodiment shown, is connected to a pressure outlet 24 of an electromagnetic pilot valve 22 via a pilot pressure line 20 and a pilot pressure orifice 21.

Adjacent thereto and spaced apart therefrom in the second direction x2 are the second valve collar 16.2, the second valve pocket 17.2 and a second port 19.2. The second port 19.2 is a pressure outlet and is connected to a lube oil line 23. The lube oil line 23 leads downstream to the lube oil valve 14, which regulates a secondary system pressure $P_{sys2}$ in the secondary circuit 12 (or lube oil circuit/cooling oil circuit) of the hydraulic system 1.

Adjacent thereto and spaced apart therefrom in the second direction x2 are the third valve collar 16.3, the third valve pocket 17.3, and a third port 19.3 and a fourth port 19.4. The third port 19.3 is a pressure inlet, which is connected to the first pressure outlet 6 of the pump system 5 via a primary pressure line 37. The fourth port 19.4 is a pressure outlet, which is connected to the system pressure line 11, within which a primary system pressure $P_{sys1}$ prevails, the primary system pressure $P_{sys1}$ being regulated by the system pressure valve 8.

Adjacent thereto and spaced apart therefrom in the second direction x2 are the fourth valve collar 16.4, the fourth valve pocket 17.4 and a fifth port 19.5. The fifth port 19.5 is a pressure outlet and is connected to the lube oil line 23, which leads downstream to the lube oil valve 14 and transitions into the secondary circuit 12.

Adjacent thereto and spaced apart therefrom in the second direction x2 are the fifth valve collar 16.5, the fifth valve pocket 17.5, and a sixth port 19.6 and a seventh port 19.7. The sixth port 19.6 is a pressure inlet, which is connected to the second pressure outlet 7 of the pump system 5 via a secondary pressure line 38. The seventh port 19.7 is a pressure outlet, which is connected to the system pressure line 11, within which the primary system pressure $P_{sys1}$ prevails, the primary system pressure $P_{sys1}$ being regulated by the system pressure valve 8.

Adjacent thereto and spaced apart therefrom in the second direction x2 are the sixth valve collar 16.6, the sixth valve pocket 17.6 and an eighth port 19.8. The eighth port 19.8 is a pressure outlet and is connected to a pressureless tank T via an orifice.

Finally, adjacent thereto and spaced apart therefrom in the second direction x2, the seventh valve collar 16.7, the seventh valve pocket 17.7 and a ninth port 19.9 are arranged in the area of a second end face S2 of the system pressure valve 8. The ninth port 19.9 is a pressure inlet and is connected to the first pressure inlet 6 of the pump system 5 via an orifice 25.

The system pressure valve slide 9 has a piston rod 27. Multiple pistons 28, 29, 30 and 31 are arranged on the piston rod 27. The individual pistons 28, 29, 30 and 31 are connected, more particularly fixedly, to the piston rod 27. The pistons 28, 29, 30 and 31 extend further outwards in the radial direction r of the valve slide 9 than the piston rod 27. The diameters of the pistons 28, 29, 30 and 31 are selected such that the pistons 28, 29, 30 and 31 can be moved back and forth together with the piston rod 27 in the longitudinal direction L within the longitudinal hole 18 of the valve housing 10 and specifically, more particularly, in a (largely) sealing and frictionless manner. The valve pockets 17.1 through 17.7 in turn extend further outwards in the radial direction r of the valve slide 27 than the pistons 28, 29, 30 and 31.

A first piston 28 is arranged in the area of the first face end S1. In addition, a second piston 29 is arranged adjacent to the first piston 28 and at an axial distance from the first piston 29 in the second direction x2. Moreover, a third piston 30 is arranged adjacent to the second piston 29 and at an axial distance from the second piston 29 in the second direction x2. Finally, a fourth piston 31 is arranged directly adjacent to the third piston 30 in the area of the second end face S2.

The first piston 28 seals off the first valve pocket 17.1 with respect to the second valve pocket 17.2 regardless of the position of the system pressure valve slide 9 in relation to the valve housing 10, and so there is no direct connection between the first valve pocket 17.1 and the second valve pocket 17.2. As a result, the first port 19.1 is not connected to the second port 19.2 either. Similarly, the second piston 29 seals off the third valve pocket 17.3 from the fourth valve pocket 17.4 regardless of the position of the system pressure valve slide 9 in relation to the valve housing 10, and so the third valve pocket 17.3 is not connected to the fourth valve pocket 17.4, and so neither the third port 19.3 nor the fourth port 19.4 is connected to the fifth port 19.5. Moreover, the third piston 30 seals off the fifth valve pocket 17.5 from the sixth valve pocket 17.6 regardless of the position of the system pressure valve slide 9 in relation to the valve housing 10, and so the fifth valve pocket 17.5 is not connected to the sixth valve pocket 17.6, and so neither the sixth port 19.6 nor the seventh port 19.7 is connected to the eighth port 19.8. In addition, the fourth piston 31 seals off the sixth valve pocket 17.6 from the seventh valve pocket 17.7 regardless of the position of the system pressure valve slide 9 in relation to the valve housing 10, and so the sixth valve pocket 17.6 is not connected to the seventh valve pocket 17.7, and so the eighth port 19.8 is not connected to the ninth port 19.9.

The feature "connected" is understood to mean, more particularly, that the particular interconnected elements are connected to each other in a hydraulically conductive manner, i.e., oil can flow from the one element to the other element and, optionally, vice versa. The feature "seals off," "disconnects," "disconnected" or "not connected," however, can be understood to mean, more particularly, that the particular elements that are disconnected from each other are not connected to each other in a hydraulically conductive manner, i.e., no oil can flow from the one element to the other element and, optionally, vice versa.

The first piston 28 acts as an actuating piston, is cup-shaped and forms an interior space 32 as well as an inner pressure surface 33, which extends in the radial direction r (and, therefore, transversely to the longitudinal axis L and to the axial directions x1, x2). The spring element 15 generates a mechanical preload force $F_{mech}$, which acts in the second direction x2 on the inner pressure surface 33 of the first piston 28. The first valve pocket 17.1 is connected to the interior space 32 of the first piston 28 via the longitudinal bore 18. The spring element 15 mechanically preloads the system pressure valve slide 9 in a first switching position. When the system pressure valve slide 9 is in the first switching position, the first piston 28 seals off the second valve pocket 17.2 from the third valve pocket 17.3, wherein the second piston 29 seals off the fourth valve pocket 17.4 from the fifth valve pocket 17.5. The system pressure valve slide 9 can be displaced in the second axial direction x2 to such an extent that the fourth piston 31 impacts an end-face end of the valve housing 10 in the second axial direction x2 in the area of the seventh valve pocket 17.7. This axial end position, which is referred to as a normal or basic position, is always assumed by the system pressure valve slide 9, more particularly, when the hydraulic system 1 is switched to a pressureless condition (normal or basic position of the system pressure valve 8).

The mechanical preload force $F_{mech}$ of the spring element 15 can be boosted by a hydraulic pilot pressure $P_{vor}$, which is generated by the pilot valve 22. A pressure inlet of the pilot valve 22 can be connected to the primary circuit 11 in order to supply the pilot valve 22 with pressurized oil. The pilot valve 22 outputs the hydraulic pilot pressure $P_{vor}$. The pilot pressure $P_{vor}$ results in a hydraulic pilot force $F_{vor}$, which acts upon the system pressure valve slide 9 in the same direction x2 as the mechanical preload force $F_{mech}$ of the spring element 15, and so the hydraulic pilot force $F_{vor}$ boosts the mechanical preload force $F_{mech}$. The pilot valve 22 can have, for example, a pressure-current characteristic curve with a falling gradient, and so the pilot valve 22 supplies, via the pressure outlet 24, the maximum possible hydraulic pilot pressure $P_{vor}$ into the pilot pressure line 20 when an electromagnetic actuator 26 of the pilot valve 22 is not energized. This is more particularly the case when a current or voltage supply to the electronic transmission control unit 35 is switched off during an activation of a mechanical emergency operation of the automatic transmission 2.

When the system pressure valve slide 9 is in the first switching position, the first piston 28 seals off the second valve pocket 17.2 from the third valve pocket 17.3, and so the second valve pocket 17.2 is not connected to the third valve pocket 17.3, and so the second port 19.2 is connected neither to the third port 19.3 nor to the fourth port 19.4. In this way, hydraulic fluid, which is delivered by the pump system 5, output via the first pressure outlet 6 of the first pump P and applied at the third port 19.3, is directed via the third valve pocket 17.3, the longitudinal bore 18 and the fourth port 19.4 of the system pressure valve 8 exclusively into the primary circuit 11 and not into the secondary circuit 12 when the system pressure valve slide 9 is in the first switching position.

When the system pressure valve slide 9 is in the first switching position, the second piston 29, furthermore, seals off the fourth valve pocket 17.4 from the fifth valve pocket 17.5 (in deviation from the second switching position of the system pressure valve slide 9 shown by FIG. 1), and so the fourth valve pocket 17.4 is not connected to the fifth valve pocket 17.3, and so the fifth port 19.5 is connected neither to the sixth port 19.6 nor to the seventh port 19.7. In this way, hydraulic fluid, which is delivered by the pump system 5 and output via the second pressure outlet 7 of the second pump S, is directed via the sixth port 19.6, the fifth valve pocket 17.5, the longitudinal bore 18 and the seventh port 19.7 of the system pressure valve 8 exclusively into the primary circuit 11 and not into the secondary circuit 12 when the system pressure valve slide 9 is in the first switching position.

Due to the fact that hydraulic fluid delivered by the pump system 5 and output via the two pressure outlets 6, 7 of the pump system 5 does not flow via the system pressure valve 8 into the secondary circuit 12, but rather exclusively into the primary circuit 11, the system pressure valve 8 sets a maximum primary system pressure $P_{sys1}$ in the primary circuit 11 when the system pressure valve slide 9 is in the first switching position. The primary system pressure $P_{sys1}$ is used more particularly for engaging the shift elements of the automatic transmission 2. Due to this behavior, an operating state for the pump system 5 results, which can be referred to as "single-circuit operation." The first pump P of the pump system 5 builds up a primary pressure $P_{prim}$ in the primary pressure line 37 by way of the first pump P delivering a volumetric flow of oil into the primary pressure line 37 via the first pressure outlet 6 of the first pump P. Similarly, the second pump S of the pump system 5 builds up a secondary pressure $P_{sek}$ in the secondary pressure line 38 by way of the second pump S delivering a volumetric flow of oil into the secondary pressure line 38 via the second pressure outlet 7 of the second pump S. Approximately the same pressure prevails in both pump flows in the single-circuit operation of the pump system 5. The secondary pressure $P_{sek}$, which prevails in the secondary pressure line 38, is raised to the primary pressure $P_{prim}$, which prevails in the primary pressure line 37.

When the pump system 5 delivers hydraulic fluid into the hydraulic system 1, a pressure arises, which can be regulated via the system pressure valve 8. As mentioned above, the ninth port 19.9 of the system pressure valve 8 is connected to the first pressure outlet 6 of the pump system 5 via an orifice 25. Essentially, this pressure control functions in such a way that the primary pressure PP m generated by the first pressure outlet 6 of the pump system 5 is fed via the orifice 25 and the ninth port 19.9 of the seventh valve pocket 17.7 to the longitudinal bore 18 and, there, acts in the first axial direction x1 upon an end-face pressure surface 36 of the system pressure valve slide 9. This feedback of the primary pressure $P_{prim}$ results in a feedback force $F_{prim}$, which counters the mechanical preload force $F_{mech}$ of the spring element 15 and the hydraulic pilot force $F_{vor}$ of the pilot valve 22. The feedback force $F_{prim}$ therefore acts upon the system pressure valve slide 9 such that the system pressure valve slide 9 tends to move toward an end stop on the first end face S1. When the system pressure valve slide 9 is in the end stop on the first end face S1, the first piston 28 impacts an end-face end of the valve housing 10 in the first axial direction x1 in the area of the first valve pocket 17.1 on the spring side.

On a path from the first switching position into the end stop on the first end face S1, the system pressure valve slide 9 assumes a second switching position and a third switching position, wherein the first piston 28 and the second piston 29 pass over the second valve pocket 17.2 and the fourth valve pocket 17.4, respectively, via which an excess volumetric flow of oil can be drained and thus the primary system pressure $P_{sys1}$ in the regulated primary system pressure circuit 11 can be vented and reduced.

In detail, when the system pressure valve slide 9 is in the second switching position, the first piston 28 (as in the first switching position as well and as shown in FIG. 1) also seals off the second valve pocket 17.2 from the third valve pocket 17.3, and so the second valve pocket 17.2 is not connected to the third valve pocket 17.3, and so the second port 19.2 is connected neither to the third port 19.3 nor to the fourth port 19.4. In this way, hydraulic fluid, which is delivered by the pump system 5 and output via the first pressure outlet 6 of the pump system 5, is directed via the third port 19.3, the third valve pocket 17.3, the longitudinal bore 18 and the fourth port 19.4 of the system pressure valve 8 exclusively into the primary circuit 11 and not into the secondary circuit 12 when the system pressure valve slide 9 is in the second switching position.

However, when the system pressure valve slide 9 is in the second switching position, the second piston 29 now opens (unlike the case in the first switching position) the fourth valve pocket 17.4 with respect to the fifth valve pocket 17.5, and so the fourth valve pocket 17.4 is connected to the fifth valve pocket 17.5 (as shown in FIG. 1), and so the fifth port 19.5 is now connected, more particularly, to the sixth port 19.6. In this way, a first portion of the hydraulic fluid, which is delivered by the pump system 5 and output via the second pressure outlet 7 of the pump system 5, is directed via the sixth port 19.6, the fifth valve pocket 17.5, the longitudinal bore 18 and the seventh port 19.7 of the system pressure valve 8 into the primary circuit 11 when the system pressure valve slide 9 is in the second switching position. A second portion of the hydraulic fluid, which is delivered by the pump system 5 and output via the second pressure outlet 7 of the pump system 5, is directed via the sixth port 19.6, the fifth valve pocket 17.5, the longitudinal bore 18 and the fifth port 19.5 of the system pressure valve 8 into the secondary circuit 12 when the system pressure valve slide 9 is in the second switching position.

Due to this behavior, an operating state for the pump system 5 results, which can be referred to as "dual-circuit operation." In the dual-circuit operation of the pump system 5, the pressure in the secondary flow is reduced. The primary system pressure $P_{sys1}$ is regulated by the system pressure valve 8. The secondary system pressure $P_{sys2}$ is regulated by the lubricating valve 14. The dual-circuit operation can be achieved only when the delivery rate of the primary flow is sufficient to cover the demand of the primary circuit 11.

When the system pressure valve slide 9 moves from the second switching position further toward the end stop on the first end face S1 and thereby assumes the third switching position, the first piston 28 then opens (unlike the case in the first and the second switching positions) the second valve pocket 17.2 with respect to the third valve pocket 17.3, and so the second valve pocket 17.2 is connected to the third valve pocket 17.3, and so the second port 19.2 is connected, more particularly, to the third port 19.3. In this way, a first portion of the hydraulic fluid, which is delivered by the pump system 5 and output via the first pressure outlet 6 of the pump system 5, is directed via the third port 19.3, the third valve pocket 17.3, the longitudinal bore 18 and the fourth port 19.4 of the system pressure valve 8 into the primary circuit 11 when the system pressure valve slide 9 is in the third switching position. A second portion of the hydraulic fluid, which is delivered by the pump system 5 and output via the first pressure outlet 6 of the pump system 5, is directed via the third port 19.3, the third valve pocket 17.3, the longitudinal bore 18 and the second port 19.2 of the system pressure valve 8 into the secondary circuit 12 when the system pressure valve slide 9 is in the third switching position. The second piston 29, furthermore, opens (as in the above-described second switching position, although now with a larger opening cross-section) the fourth valve pocket 17.4 with respect to the fifth valve pocket 17.5 when the system pressure valve slide 9 is in the third switching position, and so even more hydraulic fluid is delivered into the lubrication pressure line 23 when the system pressure valve slide 9 is in the third switching position (as compared to the second switching position). In order to vary the level of the primary system pressure $P_{sys1}$, the pilot pressure $P_{vor}$ in the first valve pocket 17.1 on the spring side can be varied via the pilot valve 9 via the hydraulic pilot pressure line 21.

In the dual-circuit operation, the system pressure valve 8 regulates on a primary control edge 34 of the first piston 28. In order to switch from this state into the single-circuit operation, the system pressure valve 8 must switch the control edge and move the system pressure valve slide 9 onto a secondary control edge 35 of the second piston 29 (first switching position of the system pressure valve slide 9, see above). This path change does not take place infinitely quickly, and therefore the volumetric flow of the secondary flow can not yet support the primary flow 11 during the displacement (the pressure is below the primary pressure). If the oil demand exceeds the oil supply from the primary flow during this time, system pressure drops can occur, which negatively affect the shift quality. Only once the system pressure valve 8 has moved the system pressure valve slide 9 onto the secondary control edge can one hundred percent (100%) of the volumetric flow of the pump system 5 be utilized. With the knowledge of the state of the pump flows, boundaries can therefore be drawn within the shift software of the automatic transmission 2 and the sequences of the gear shifts can be temporally controlled such that the pump system 5 is not overloaded with respect to an oil requirement and pressure drops are avoided. A pressure sensor is not used in the hydraulic system 1 shown by FIG. 1, and therefore the pressures are only controlled and the exact pressure in the flows is not available as a measured value in the software.

Figure 6:
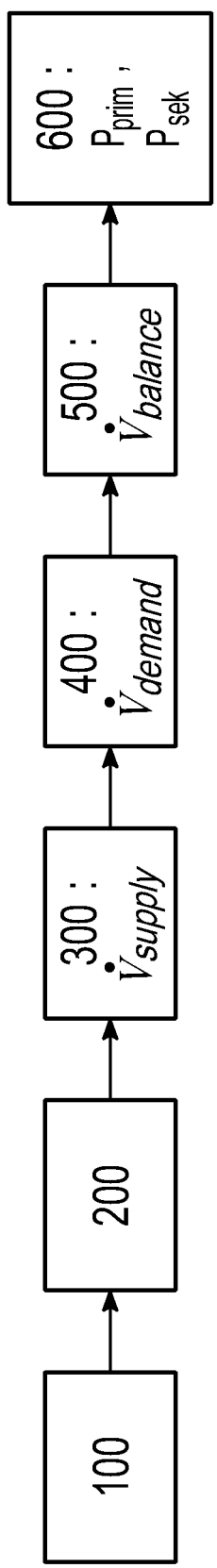
FIG. 6 shows a sequence of one exemplary embodiment of a method according to example aspects of the invention for the open-loop control of the pump system.

FIG. 6 shows a sequence of a method for the open-loop control of the pump system 5 from FIG. 1. In a first step 100, the automatic transmission 2 for the motor vehicle 3 and a hydraulic calculation model 41 are provided. The automatic transmission 2 has the hydraulic system 1, which includes an electronic control unit 42. The hydraulic calculation model 41 is implemented, more particularly, by a computer program product and includes oil supplies of the two pumps P, S and oil demands of the automatic transmission 2 for various operating states of the automatic transmission 2. The hydraulic calculation model 41 in the exemplary embodiment shown is stored as a computer program product on an electronic memory unit 43 of the electronic control unit 42.

Figure 4:
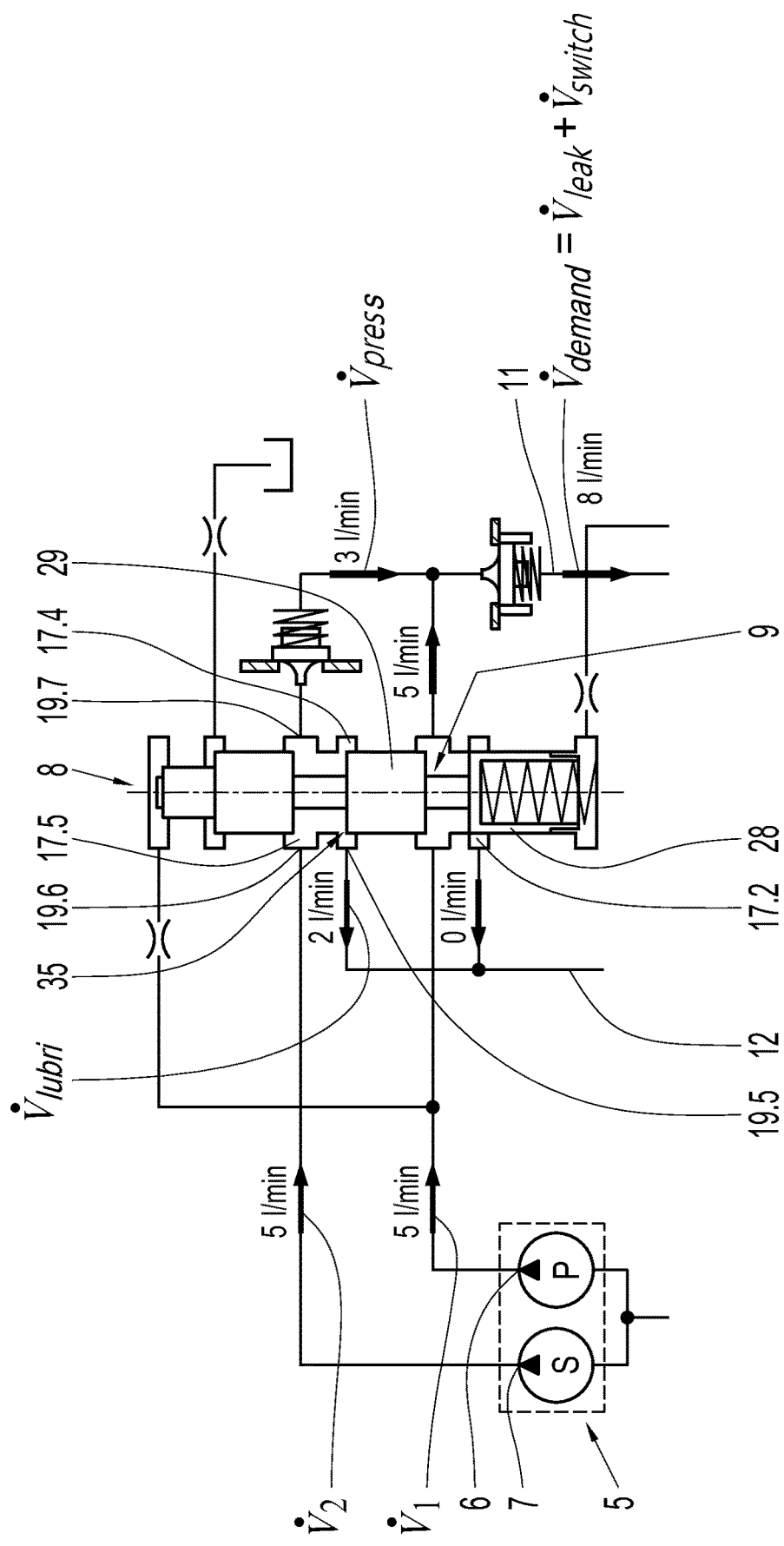
FIG. 4 shows a portion of the hydraulic circuit diagram from FIG. 1, the pump system being operated in a single-circuit operation.

FIG. 4 shows oil supplies of the pump system 5 and oil demands of the primary circuit 11 while the pump system 5 is in the single-circuit operation. In principle, the system pressure valve slide 9 is in the first switching position, in which the second piston 29 seals off the fourth valve pocket 17.4 from the fifth valve pocket 17.5 (in deviation from the second switching position of the system pressure valve slide 9 shown by FIG. 4), and so the fourth valve pocket 17.4 is not connected to the fifth valve pocket 17.5, and so the fifth port 19.5 is connected neither to the sixth port 19.6 nor to the seventh port 19.7. In this way, hydraulic fluid, which is delivered by the pump system 5 and output via the second pressure outlet 7 of the second pump S, is directed via the sixth port 19.6, the fifth valve pocket 17.5, the longitudinal bore 18 and the seventh port 19.7 of the system pressure valve 8 exclusively into the primary circuit 11 and not into the secondary circuit 12 when the system pressure valve slide 9 is in the first switching position. However, when the primary circuit 11 does not require one hundred percent (100%) of the volumetric flow of oil provided by the pump system 5, excess oil can be drained into the secondary circuit 12 in the single-circuit operation via the secondary control edge 35 of the second piston 29, as shown by FIG. 4. In a second step 200, the electronic control unit 42 accesses the hydraulic calculation model 41.

In a third method step 300, a certain oil supply is ascertained by the electronic control unit 42, which the two pumps P, S provide in a certain operating state of the automatic transmission 2 according to the hydraulic calculation model 41. The oil supply is therefore an ascertained value and/or a calculated value and not a measured value. In detail, with respect to the single-circuit operation from FIG. 4, it is ascertained on the basis of the hydraulic calculation model 41 that the first pump P delivers a first oil supply in the form of a first volumetric flow $\dot{V}_1$ (primary flow) and the second pump S delivers a second oil supply in the form of a second volumetric flow $V_2$ (secondary flow). The first volumetric flow $\dot{V}_1$ and the second volumetric flow $V_2\bullet$ are both five (5) liters of oil per minute in the example according to FIG. 4. The oil supplies are stored within the hydraulic calculation model 41 depending on various system parameters (for example, pressures such as $P_{sys1}$ or $P_{sys2}$, temperature, gear ratio change, torque profile), whereby the state of the pump system 5 can be determined via back-calculation. The first volumetric flow $\dot{V}_1$ and the second volumetric flow $V_2$ in combination yield an overall supply volumetric flow $\dot{V}_{supply}$ of ten (10) liters per minute. With the knowledge of the transmission input speed of the internal combustion engine 4.1 and, optionally, the rotational speed of the pump electric motor EMU (cf. FIG. 3), the delivery rate of the two flows $\dot{V}_1$ and $\dot{V}_2$ can be determined via a regression model 44 of the pump system 5 included in the hydraulic calculation model 41 and thus the volumetric flow conditions can be calculated in the controller.

In a fourth method step 400, a certain oil demand, which the hydraulic system 1 requests of the two pumps P, S in the certain operating state of the automatic transmission 2 according to the hydraulic calculation model 41, is ascertained by the electronic control unit 42. The oil demand is therefore an ascertained value and/or a calculated value and not a measured value. In detail, with respect to the single-circuit operation from FIG. 4, it is ascertained on the basis of the hydraulic calculation model 41 that the primary circuit 11 requires an oil demand in the form of a demand volumetric flow of oil $\dot{V}_{demand}$, for example, in order to fill a clutch for the engagement thereof. The demand volumetric flow of oil $\dot{V}_{demand}$ is eight (8) liters per minute in the exemplary embodiment shown by FIG. 4. In the single-circuit operation shown by FIG. 4, the system pressure valve 8 regulates via the secondary control edge 35, the first piston 28 permanently closing the second valve pocket 17.2. As a result, the entire first volumetric flow $\dot{V}_1$ (i.e., the entire five (5) liters per minute) always flows into the primary circuit 11 via the system pressure valve 8, specifically regardless of whether the secondary control edge 35 opens or closes in the direction of the secondary circuit 12 (illustrated in FIG. 4 with "5 l/min" in the area of the third valve pocket 17.3 in the direction of the primary circuit 11). No oil flows into the secondary circuit 12 via the second valve pocket 17.2 (illustrated in FIG. 4 with "0 l/min" in the area of the second valve pocket 17.2). In the example according to FIG. 4, however, the system pressure valve slide 9 is displaced in the direction of its second shift position to such an extent that a portion of the second volumetric flow $\dot{V}_2$ flows into the secondary circuit 12 via the primary control edge 35 and the fourth valve pocket 17.4. This portion of the second volumetric flow $\dot{V}_2$ is referred to as a lubrication volumetric flow $\dot{V}_{lubri}$ and is two (2) liters per minute in the example according to FIG. 4. The remaining portion of the second volumetric flow $\dot{V}_2$ flows into the primary circuit 11 via the system pressure valve 8. This remaining portion of the second volumetric flow $\dot{V}_2$ is referred to as a pressure volumetric flow $\dot{V}_{press}$ and is three (3) liters per minute in the example according to FIG. 4. The oil demands (and the oil supplies) are stored within the hydraulic calculation model 41 depending on various system parameters (for example, pressure, temperature, gear ratio change, torque profile), whereby the state of the pump system 5 can be determined via back-calculation.

The method steps 300 and 400 can be carried out one after the other (as shown by FIG. 6). Alternatively, the sequence of the method steps 300 and 400 can also be interchanged, and so the fourth method step 400 is carried out before the third method step 300. Alternatively, the two method steps 300, 400 can be carried out in parallel.

In a fifth method step 500, an oil balance $\dot{V}_{balance}$ is ascertained by the electronic control unit 42 on the basis of the certain oil $\dot{V}_{supply}$ and on the basis of the certain oil demand $\dot{V}_{demand}$. The oil balance $\dot{V}_{balance}$ is ascertained by subtracting the demand volumetric flow of oil $\dot{V}_{demand}$ from at least one portion of the supply volumetric flow $\dot{V}_{supply}$. In the example according to FIG. 4, the demand volumetric flow of oil $\dot{V}_{demand}$ (eight (8) liters per minute) is subtracted from the first volumetric flow $\dot{V}_1$ (five (5) liters per minute as a portion of the supply volumetric flow $\dot{V}_{supply}$) provided by the first pump P of the pump system 5. This yields a volumetric flow of negative three (−3) liters per minute for the oil balance $\dot{V}_{balance}$. This value corresponds to a "primary excess amount," i.e., the volumetric flow via the primary control edge 34, and is calculated from the difference between the delivery rate of the primary flow $\dot{V}_1$ and the primary demand $\dot{V}_{demand}$ of the primary circuit 11 (leakage volumetric flow $\dot{V}_{leak}$ plus engagement volumetric flow $\dot{V}_{switch}$) and, optionally, plus oil flow via a hydrodynamic torque converter of the automatic transmission 2; $\dot{V}_{demand} = \dot{V}_{leak} + \dot{V}_{switch}$)). If the variable is positive (cf. FIG. 5), the pump system 5 is in the dual-circuit operation (the primary flow can cover the primary demand and the excess amount is discharged). If the variable is computationally negative (as in the example according to FIG. 4), the primary pump flow $\dot{V}_1$ does not suffice to cover the demand and the pump system 5 is in the single-circuit operation.

Figure 5:
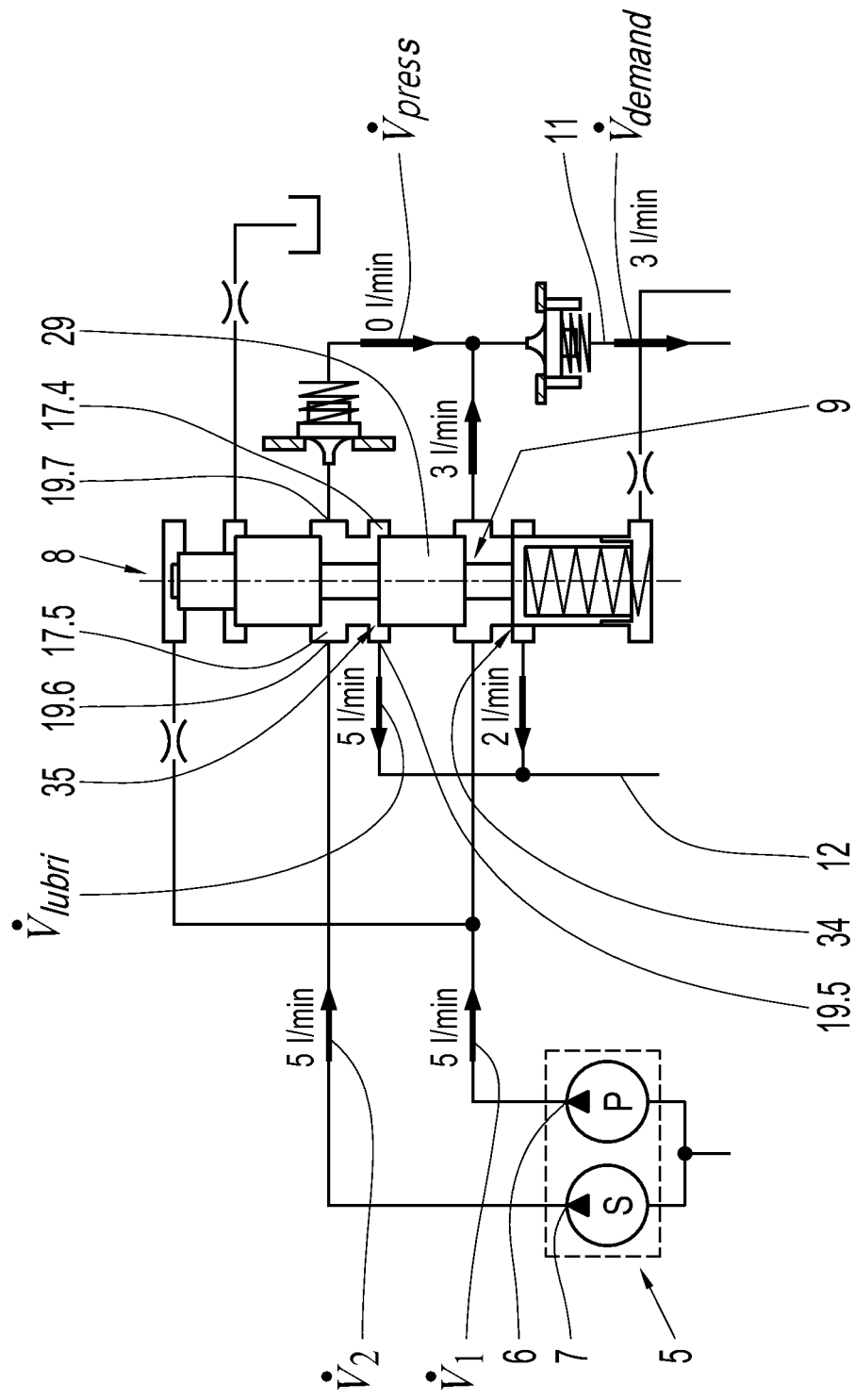
FIG. 5 shows a portion of the hydraulic circuit diagram from FIG. 1, the pump system being operated in a dual-circuit operation.

FIG. 5 shows oil supplies of the pump system 5 and oil demands of the primary circuit 11 while the pump system 5 is in the dual-circuit operation. The pump system 5 is driven at the same rotational speed as in the example according to FIG. 4. In principle, the system pressure valve slide 9 is in the second switching position, in which the second piston 29 releases a connection between the fourth valve pocket 17.4 and the fifth valve pocket 17.5, and so the fourth valve pocket 17.4 is connected to the fifth valve pocket 17.5, and so that the fifth port 19.5 is connected to the sixth port 19.6 and to the seventh port 19.7. In this way, oil of the secondary flow $\dot{V}_2$, which is delivered by the pump system 5 and is output via the second pressure outlet 7 of the second pump S, is directed into the primary circuit 11 via the sixth port 19.6, the fifth valve pocket 17.5, the longitudinal bore 18 and the seventh port 19.7 of the system pressure valve 8 and into the secondary circuit 12 via the secondary control edge 35 and the fifth port 19.5 of the system pressure valve 8 when the system pressure valve slide 9 is in the second switching position. Excess oil from the primary flow $\dot{V}_1$ is discharged into the secondary circuit 12 via the primary control edge 34 in the dual-circuit operation. The electronic control unit 42 also accesses the hydraulic calculation model 41 in a second step 200 in the example according to FIG. 5.

In a third method step 300, a certain oil supply is ascertained by the electronic control unit 42, which the two pumps P, S provide in a certain operating state of the automatic transmission 2 according to the hydraulic calculation model 41. In detail, with respect to the dual-circuit operation from FIG. 5, it is ascertained on the basis of the hydraulic calculation model 41 that the first pump P delivers a first oil supply in the form of a first volumetric flow $\dot{V}_1$ (primary flow) and the second pump S delivers a second oil supply in the form of a second volumetric flow $\dot{V}_2$ (secondary flow). The first volumetric flow $\dot{V}_1$ and the second volumetric flow $\dot{V}_2$ are both five (5) liters of oil per minute in the example according to FIG. 5. The oil supplies are stored within the hydraulic calculation model 41 depending on various system parameters (for example, pressures such as $P_{sys1}$ or $P_{sys2}$, temperature, gear ratio change, torque profile), whereby the state of the pump system 5 can be determined via back-calculation. The first volumetric flow $\dot{V}_1$ and the second volumetric flow $\dot{V}_2$ in combination yield in an overall supply volumetric flow $\dot{V}_{supply}$ of ten (10) liters per minute. With the knowledge of the transmission input speed of the internal combustion engine 4.1 and, optionally, the rotational speed of the pump electric motor EMU (cf. FIG. 3), the delivery rate of the two flows $\dot{V}_1$ and $\dot{V}_2$ can be determined via the regression model 44 of the pump system 5 included in the hydraulic calculation model 41 and thus the volumetric flow conditions can be calculated in the controller.

In a fourth method step 400, a certain oil demand, which the hydraulic system 1 requests of the two pumps P, S in the certain operating state of the automatic transmission 2 according to the hydraulic calculation model 41, is ascertained by the electronic control unit 42. In detail, with respect to the dual-circuit operation according to FIG. 5, it is ascertained on the basis of the hydraulic calculation model 41 that the primary circuit 11 requires an oil demand in the form of a demand volumetric flow of oil $\dot{V}_{demand}$, which is only three (3) liters per minute in the exemplary embodiment shown by FIG. 5 (instead of eight (8) liters per minute according to the example according to FIG. 4). In the dual-circuit operation shown by FIG. 5, the system pressure valve 8 regulates via the primary control edge 34, the first piston 28 releasing the second valve pocket 17.2 (in deviation from the view according to FIG. 5). As a result, three (3) liters per minute of the first volumetric flow $\dot{V}_1$ (five (5) liters per minute overall) flow into the primary circuit 11 via the system pressure valve 8 and two (2) liters per minute flow into the secondary circuit via the primary control edge 34. In addition, the entire secondary flow $\dot{V}_2$ is discharged into the secondary circuit via the secondary control edge 35 ($\dot{V}_{lubri}$=5 liters per minute), and so the secondary flow $\dot{V}_2$ does not supply the primary circuit 11 with oil ($\dot{V}_{press}$=0). The method steps 300 and 400 can be carried out one after the other (as shown by FIG. 6). Alternatively, the sequence of the method steps 300 and 400 can also be interchanged, and so the fourth method step 400 is carried out before the third method step 300. Alternatively, the two method steps 300, 400 can be carried out in parallel.

In a fifth method step 500, an oil balance $\dot{V}_{balance}$ is ascertained by the electronic control unit 42 on the basis of the certain oil supply $\dot{V}_{supply}$ and on the basis of the certain oil demand $\dot{V}_{demand}$. The oil balance $\dot{V}_{balance}$ is ascertained by subtracting the demand volumetric flow of oil $\dot{V}_{demand}$ from at least one portion of the supply volumetric flow $\dot{V}_{supply}$. In the example according to FIG. 5, the demand volumetric flow of oil $\dot{V}_{demand}$ (three (3) liters per minute) is subtracted from the first volumetric flow $\dot{V}_1$ (five (5) liters per minute as a portion of the supply volumetric flow $\dot{V}_{supply}$) provided by the first pump P of the pump system 5. This yields a volumetric flow of two (2) liters per minute for the oil balance $\dot{V}_{balance}$. This value corresponds to a "primary excess," i.e., the volumetric flow via the primary control edge 34, and is calculated from the difference between the delivery rate of the primary flow $\dot{V}_1$ and the primary demand $\dot{V}_{demand}$ of the primary circuit 11. If the variable is positive (as is the case in the example according to FIG. 5), the pump system 5 is in the dual-circuit operation. If the variable is computationally negative (cf. FIG. 4), the primary pump flow $\dot{V}_1$ does not suffice to cover the demand and the pump system 5 is in the single-circuit operation.

In a sixth method step 600, the output pressures $P_{prim}$, $P_{sek}$ of the two pumps P, S are controlled by way of an open-loop system by the electronic control unit 42, specifically on the basis of the ascertained certain oil supply $\dot{V}_{supply}$ and on the basis of the ascertained oil demand $\dot{V}_{demand}$. This is carried out, more particularly, such that the pump system is operated either in the single-circuit operation (cf. FIG. 4) or in the dual-circuit operation (cf. FIG. 5) on the basis of the ascertained oil balance $\dot{V}_{balance}$.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

EMU electric motor unit/additional electric motor
$F_{mech}$ mechanical preload force of spring element
$F_{prim}$ feedback force
$F_{vor}$ pilot force
GE main input shaft of automatic transmission
L longitudinal axis of system pressure valve
n1 internal combustion engine speed
n2 electric motor speed
r radial direction of valve housing
P first pump (primary pump)
$P_{prim}$ primary pressure of pump system
$P_{sek}$ secondary pressure of pump system
$P_{sys1}$ primary system pressure
$P_{sys2}$ secondary system pressure
$P_{vor}$ pilot pressure
S second pump (secondary pump)
S1 first end face of system pressure valve
S2 second end face of system pressure valve
T oil sump/pressureless tank
$\dot{V}_1$ first volumetric flow (primary flow)
$\dot{V}_2$ second volumetric flow (secondary flow)
$\dot{V}_{balance}$ oil balance
$\dot{V}_{demand}$ demand volumetric flow of oil
$\dot{V}_{leak}$ leakage volumetric flow
$\dot{V}_{lubri}$ lubrication volumetric flow
$\dot{V}_{press}$ pressure volumetric flow
$\dot{V}_{switch}$) engagement volumetric flow
$\dot{V}_{supply}$ supply volumetric flow
x1 first axial direction
x2 second axial direction
1 hydraulic system
2 automatic transmission
3 motor vehicle
4 prime mover
4.1 internal combustion engine
4.2 electric machine (motor/generator)
5 pump system
6 first pressure outlet of pump system
7 second pressure outlet of pump system
8 system pressure valve
9 system pressure valve slide
10 valve housing
11 primary circuit
12 secondary circuit
13 tertiary circuit
14 lubricating valve
15 spring element
16.1 first valve collar
16.2 second valve collar
16.3 third valve collar
16.4 fourth valve collar
16.5 fifth valve collar
16.6 sixth valve collar
16.7 seventh valve collar
17.1 first valve pocket
17.2 second valve pocket
17.3 third valve pocket
17.4 fourth valve pocket
17.5 fifth valve pocket
17.6 sixth valve pocket
17.7 seventh valve pocket 18 longitudinal bore of valve housing
19.1 first port of system pressure valve
19.2 second port of system pressure valve
19.3 third port of system pressure valve
19.4 fourth port of system pressure valve
19.5 fifth port of system pressure valve
19.6 sixth port of system pressure valve
19.7 seventh port of system pressure valve
19.8 eighth port of system pressure valve
19.9 ninth port of system pressure valve
20 pilot pressure line
21 pilot pressure orifice
22 pilot valve
23 lube oil line
24 pressure outlet of pilot valve
25 orifice
26 electromagnetic actuator of pilot valve
27 piston rod
28 first piston
29 second piston
30 third piston
31 fourth piston
32 interior space of first piston
33 interior pressure surface of first piston
34 primary control edge
35 secondary control edge
36 end-face pressure surface of system pressure valve slide
37 primary pressure line
38 secondary pressure line
39 summation gearbox
40 input shaft of pump system
41 hydraulic calculation model
42 electronic control unit
43 electronic memory unit
44 regression model of pump system
100 first method step
200 second method step
300 third method step
400 fourth method step
500 fifth method step
600 sixth method step

The invention claimed is:

1. A method for open-loop control of a pump system (5) in a transmission (2) for a motor vehicle (3), the transmission (2) including a hydraulic system (1) and an electronic control unit (42), the hydraulic system (1) having a primary circuit (11) for supplying shift elements of the transmission (2) and a secondary circuit (12) for lubricating and cooling the transmission (2), the pump system (5) including a first pump (P) and a second pump(S), the method comprising:
accessing with the electronic control unit (42) a hydraulic calculation model (41), the hydraulic calculation model (41) including, for various operating states of the transmission (2), information regarding oil supplies of the first and second pumps (P, S) and information regarding oil demands of the transmission (2);
ascertaining with the electronic control unit (42) a certain oil supply ($\dot{V}_{supply}$) of the oil supplies that the first and second pumps (P, S) provide in a certain operating state of the various operating states of the transmission (2) according to the hydraulic calculation model (41);
ascertaining with the electronic control unit (42) a certain oil demand ($\dot{V}_{demand}$) of the oil demands that the hydraulic system (1) requests of the first and second pumps (P, S) in the certain operating state of the transmission (2) according to the hydraulic calculation model (41); and
controlling output pressures ($P_{prim}$, $P_{sek}$) of the first and second pumps (P, S) by an open-loop control adjusting a system pressure valve (8) based on the certain oil supply ($\dot{V}_{supply}$) and on the certain oil demand ($\dot{V}_{demand}$), each of the first and second pumps (P,S) being fluidly couplable to the primary circuit (11) by the system pressure valve (8).

2. The method of claim 1, wherein controlling the output pressures ($P_{prim}$, $P_{sek}$) of the first and second pumps (P, S) comprises controlling the output pressures ($P_{prim}$, $P_{sek}$) of the first and second pumps (P, S) by adjusting the system pressure valve (8) such that the pump system (5) is operated either in a single-circuit operation or in a dual-circuit operation.

3. The method of claim 2, wherein:
the pump system (5) is operated in the single-circuit operation by moving a valve slide (9) of the system pressure valve (8) of the hydraulic system (1) into a first switching position;
oil delivered by the first and second pumps (P, S) of the pump system (5) is delivered exclusively into the primary circuit (11) via the valve slide (9) when the valve slide (9) is in the first switching position; and
a secondary pressure ($P_{sek}$) output by the second pump(S) increases to a primary pressure ($P_{prim}$) output by the first pump (P) when the valve slide (9) is in the first switching position.

4. The method of claim 3, wherein:
the pump system (5) is operated in the dual-circuit operation by moving the valve slide (9) into a second switching position; and
oil delivered by at least one of the first and second pumps(S) of the pump system (5) is delivered into the secondary circuit (12) via the valve slide (9) when the valve slide (9) is in the second switching position.

5. The method of claim 1, wherein the oil supplies and the oil demands depend on system parameters ($P_{sys1}$; $P_{sys2}$) of the automatic transmission (2).

6. The method of claim 1, wherein:
the hydraulic calculation model (41) comprises a demand volumetric flow of oil ($\dot{V}_{demand}$) that the hydraulic system (2) requests of the pump system (5) in the certain operating state of the transmission (2) according to the hydraulic calculation model (41), the demand volumetric flow of oil being the certain oil demand ($\dot{V}_{demand}$); and
the hydraulic calculation model (41) comprises a supply volumetric flow of oil ($\dot{V}_{supply}$) that the pump system (5) supplies in the certain operating state of the transmission (2) according to the hydraulic calculation model (41), the certain oil supply being a portion of the supply of volumetric flow of oil ($\dot{V}_{supply}$); and
the method further comprises ascertaining with the electronic control unit (42) an oil balance ($\dot{V}_{balance}$) based on the certain oil supply ($\dot{V}_{supply}$) and on the certain oil demand ($\dot{V}_{demand}$).

7. The method of claim 6, wherein:
the demand volumetric flow of oil ($\dot{V}_{demand}$) according to the hydraulic calculation model (41) is requested by only the primary circuit (11) in the certain operating state;
the portion ($\dot{V}_1$) of the supply volumetric flow ($\dot{V}_{supply}$) according to the hydraulic calculation model (41) is provided by the first pump (P) of the pump system (5) in the certain operating state; and the oil balance ($\dot{V}_{balance}$) is ascertained by subtracting the demand volumetric flow of oil ($\dot{V}_{demand}$) from the portion ($\dot{V}_1$) of the supply volumetric flow ($\dot{V}_{supply}$).

8. The method of claim 7, wherein the demand volumetric flow of oil ($\dot{V}_{demand}$) comprises a leakage volumetric flow ($\dot{V}_{leak}$), that arises within the primary circuit (11).

9. The method of claim 7, wherein the demand volumetric flow of oil ($\dot{V}_{demand}$) comprises an engagement volumetric flow ($\dot{V}_{switch}$) that the primary circuit (11) requests of the pump system (5) for engaging a shift element of the transmission (2).

10. The method of claim 6, wherein:
the supply volumetric flow ($\dot{V}_{supply}$) depends on at least one rotational speed (n1, n2) at which the pump system (5) is driven;
the supply volumetric flow ($\dot{V}_{supply}$) includes a first pump volumetric flow ($\dot{V}_1$) and a second pump volumetric flow ($\dot{V}_2$); and
the first pump volumetric flow ($\dot{V}_1$) and the second pump volumetric flow ($\dot{V}_2$) result via a regression model (44) from the supply volumetric flow ($\dot{V}_{supply}$) of the pump system (5).

11. The method of claim 6, wherein:
the pump system (5) is drivable via a summation gearbox (39) by a prime mover (4.1) for driving the motor vehicle (3) and by an electric motor (EMU); and
the method further comprises controlling a rotational speed (n2) of the electric motor (EMU) based on the oil balance ($\dot{V}_{balance}$).

* * * * *